(12) United States Patent
Ellithorpe

(10) Patent No.: US 11,731,677 B2
(45) Date of Patent: Aug. 22, 2023

(54) HYDRAULIC LIFT DOLLY

(71) Applicant: Terry Ellithorpe, Calico Rock, AR (US)

(72) Inventor: Terry Ellithorpe, Calico Rock, AR (US)

(*) Notice: Subject to any disclaimer, the term of this patent is extended or adjusted under 35 U.S.C. 154(b) by 0 days.

(21) Appl. No.: 17/393,509

(22) Filed: Aug. 4, 2021

(65) Prior Publication Data
US 2022/0315078 A1    Oct. 6, 2022

Related U.S. Application Data

(60) Provisional application No. 63/167,963, filed on Mar. 30, 2021.

(51) Int. Cl.
*B62B 1/14* (2006.01)
*B62B 5/00* (2006.01)

(52) U.S. Cl.
CPC .............. *B62B 1/14* (2013.01); *B62B 5/0003* (2013.01)

(58) Field of Classification Search
CPC .... B62B 1/14; B62B 1/10; B62B 1/12; B62B 5/0003
See application file for complete search history.

(56) References Cited

U.S. PATENT DOCUMENTS

| | | | | |
|---|---|---|---|---|
| 2,598,489 | A * | 5/1952 | Bayer | B62B 1/14 187/244 |
| 4,728,245 | A * | 3/1988 | Shelton | B62B 3/0618 414/490 |
| 6,773,222 | B1 * | 8/2004 | Gilchrist | B60B 29/002 414/427 |
| 8,888,112 | B2 * | 11/2014 | Trapnell | B62B 1/14 187/244 |
| 10,315,714 | B2 * | 6/2019 | Epperson | B62D 63/08 |
| 10,507,855 | B2 * | 12/2019 | Murphy | B62B 3/02 |
| 10,858,027 | B2 * | 12/2020 | Casey | G01L 5/22 |
| 2021/0139096 | A1 * | 5/2021 | Hahn | B62H 3/10 |
| 2021/0316772 | A1 * | 10/2021 | Burton | B62B 5/02 |

FOREIGN PATENT DOCUMENTS

WO    WO-2018067127 A1 *    4/2018    ............... B62B 1/12

* cited by examiner

*Primary Examiner* — John D Walters
(74) *Attorney, Agent, or Firm* — Brennan, Manna & Diamond, LLC

(57) ABSTRACT

The present invention relates to a hydraulic lift dolly. The lift dolly is configured and designed to lift or lower a tray or load platform using a built-in hydraulic mechanism. The lift dolly includes a pair of support arms, a pair of actuation triggers, a tray, a pair of wheels or casters and a handle attached to the support arms. Each support arm has a hydraulic cylinder that is connected to a hydraulic source. The pair of hydraulic cylinders lift the tray when the pair of actuation triggers are pressed by an operator to provide hydraulic power to the hydraulic cylinders for lifting the connected tray. The actuation triggers are released when the tray reaches a desired height along the support arms. The hydraulic lift dolly allow users to perform loading and unloading without bending over and lifting heavy and bulky items from the dolly tray.

17 Claims, 5 Drawing Sheets

HYDRAULIC LIFT DOLLY

CROSS-REFERENCE TO RELATED APPLICATION

The present application claims priority to, and the benefit of, U.S. Provisional Application No. 63/167,963, which was filed on Mar. 30, 2021 and is incorporated herein by reference in its entirety.

FIELD OF THE INVENTION

The present invention generally relates to the field of wheeled lifting dollies. More specifically, the present invention relates to a hydraulic lift dolly system comprising a hydraulic unit to elevate a tray whereby items are lifted; thereby, eliminating the need for users to bend and to lift items off the dolly. In this manner, the hydraulic lift dolly system saves users time and effort while transporting and lifting items, and reduces the potential for injury. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, dollies (also referred to as hand trucks) are known to be used to transport heavy objects, such as refrigerators, washing machines, other large appliances, furniture, boxes and the like. Generally, an individual user will use a conventional dolly that includes a rectangular base plate with 4 wheels and one or more handles attached to the base plate, to transport bulky and/or heavy objects from one place to another. Although such conventional dolly systems assist an individual in moving such objects from one place to another, the individual is still required to physically lift the object onto and off of the dolly at the point of origin and destination. Unfortunately, individuals, especially the elderly, physically challenged or disabled, may find it extremely difficult to lift heavy objects onto or off the dolly. In fact, sometimes, it may not be possible to lift a particularly heavy and/or bulky item onto or off of the dolly even with the assistance of two or more people.

Additionally, manually lifting such heavy and/or bulky objects may cause strain or injury to the individual. Although some individuals may be able to periodically lift such heavy and/or bulky items, the risk of bodily injury to individuals working, for example, in the moving industry, increases with excessive lifting of heavy and bulky items. Personal injuries resulting from manually lifting heavy items are costly to individuals and society. Currently, transporting and lifting items using a four-wheel dolly is difficult and inconvenient for the users.

Other dollies are also available in the market to assist the users in moving bulky items. For example, the two-wheel dolly or an L-shaped handcart with a handle or handles at one end, a base and two wheels at the base, are commonly used for moving bulky and heavy objects. Though the two wheel dolly may be able to slide under an item that is to be transported, people are still required to bend over and lift the items off the base of the two-wheel dolly resulting in possible bodily strain and injuries. Whether the dolly is a four-wheel dolly or a two-wheel dolly, transporting heavy objects with current dollies is not easy or safe.

Therefore, there exists a long-felt need in the art for a lifting dolly system which assists the users in transporting heavy items. There is also a long-felt need in the art for a lifting dolly system that eliminates the need to manually lift heavy and bulky objects from the base of the conventional lifting dollies. Additionally, there is a long-felt need in the art for a lifting dolly system that does not require the users to bend and manually lift objects from the base of standard dollies. Moreover, there is a long-felt need in the art for a lifting dolly system that is easy to use by all individuals including the elderly, physically challenged, or disabled people. Further, there is a long-felt need in the art for an improved lifting dolly system that reduces the users' risk of bodily strains or injuries. Furthermore, there is a long-felt need in the art for a modified lifting dolly system that is easy to use and makes the transporting process more convenient for the users. Finally, there is a long-felt need in the art for an improved lifting dolly system that allows the users to frequently transport heavy and bulky items from one place to another without the need to lift heavy or bulky items off the dolly.

The subject matter disclosed and claimed herein, in one embodiment thereof, comprises a hydraulic vertical lift dolly. The lift dolly is configured and designed to lift or lower a tray using a built-in hydraulic mechanism. The lift dolly comprises a pair of support arms, a pair of actuation arms, a tray configured to act as a load platform, a pair of wheels or casters and a handle attached to the support arms for easy handling of the device. The hydraulic mechanism is comprised of a pair of hydraulic cylinders, wherein each hydraulic cylinder is present within a hollow support arm and is connected to a common hydraulic source. The pair of hydraulic cylinders lift or lower the tray when the pair of actuation triggers are pushed by an operator which, in turn, activates the hydraulic source and causes the same to provide power to the hydraulic cylinders. The actuation triggers are released when the tray reaches a desired height along the support arms. The casters allow the movement of the dolly on any plane surface, or even on a carpet.

In this manner, the novel hydraulic lift dolly system of the present invention accomplishes all the forgoing objectives and provides a safe, easy, and convenient solution to transporting heavy and bulky objects. The hydraulic lift dolly system of the present does not require the user to bend over and manually lift heavy or bulky items from the base of the dolly, reducing user effort and time and decreasing the risk of bodily strains or injuries.

SUMMARY OF THE INVENTION

The following summary presents a basic understanding of the disclosed invention. This summary is not an extensive overview, and it is not intended to identify key/critical elements or to limit the scope thereof. Its sole purpose is to present some general concepts in a simplified form as a prelude to the more detailed description that is presented later.

The subject matter disclosed and claimed herein, in one embodiment thereof, comprises a hydraulic lift dolly. The hydraulic lift dolly is configured and designed to lift or lower a tray using a hydraulic mechanism. The lift dolly further comprises a pair of support arms, a pair of actuating triggers, a tray configured to act as a load platform, a pair of wheels or casters and a handle attached to the support arms. The hydraulic mechanism is comprised of a pair of hydraulic cylinders, with each hydraulic cylinder connected to a common hydraulic source. The pair of cylinders lift the tray when the pair of actuating triggers are squeezed by an operator, activating the power of the hydraulic source to provide power to the hydraulic cylinders, wherein the cylinders lift the connected tray. The actuation triggers are released when the tray reaches a desired height along the support arms. The wheels or casters allow translational movement of the dolly on any smooth surface when the user pulls back on the support arms, which act as a lever to lift the tray off the surface upon which the dolly is resting.

A bottom tray is configured to allow the dolly tray acting as the load platform to be positioned in either a lowered configuration without being in contact with the ground or floor surface, or in an elevated configuration raised above the ground or floor surface, with the bottom tray supporting the dolly in an upright position.

In a further embodiment of the present invention, a hydraulic system, built within a hydraulic lift dolly to lift a tray, wherein the tray acts as a load platform, is disclosed. The hydraulic system includes a hydraulic source, a pair of hydraulic cylinders within the support arms of the dolly and a plurality of recesses in the support arms of the dolly. The hydraulic source is connected to the pair of hydraulic cylinders, wherein each hydraulic cylinder is connected to the tray. The hydraulic cylinders are configured to lift the tray when hydraulic power is provided by the hydraulic source to actuate a pair of hand actuation members of the hydraulic lift dolly. A locking pin engages with one of the plurality of recesses to stop the movement of the load platform when the pair of hand actuation members is released.

In a further embodiment of the present invention, a device for lifting heavy objects using a hydraulic system is disclosed. The device comprises a pair of connected hollow metal arms, a pair of ground casters or wheels in contact with the ground, a tray acting as a load platform extending outward from the metal arms, the tray connected to the built-in hydraulic system as a means to lift or lower a heavy or bulky item on the tray, the hydraulic system being activated with a pair of hand operated actuation triggers. Each hollow metal arm has a hydraulic cylinder connected to a hydraulic source which provides power to the hydraulic cylinders on actuation of the actuation triggers to lift the tray and lock the tray in place when the actuation triggers are released. The hydraulic mechanism engages a locking pin to one of the plurality of recesses present in the hydraulic cylinders to lock the tray at desired height.

In a further embodiment of the present invention, a device for lifting heavy and bulky objects using a hydraulic system for attachment to a two-wheel dolly is disclosed. The device comprising a hydraulic source, a pair of hydraulic cylinders, the hydraulic cylinders hydraulicly connected to the hydraulic source, a load platform, the load platform connected to the hydraulic cylinders, and a pair of hand-operated actuation triggers as a means of activating the hydraulic cylinders. The pair of hydraulic cylinders connected to the hydraulic source provide a lifting force to the load platform when the hydraulic system is activated by the actuating triggers. The components of the hydraulic system are configured for attachment to a two-wheel dolly.

In all embodiments of the present invention, an operator does not need to bend over to access an item on the dolly. The tray is lifted using the simple operation of actuating triggers to activate the hydraulic system. The hydraulic dolly is capable of lifting a load without disturbing the orientation of the load placed on the tray. The hydraulic lift dolly saves the user physical effort by providing a mechanism to lift items on the dolly's tray, thereby saving the user physical strain and possible injury when transporting heavy and bulky items In another further embodiment of the present invention, the hydraulic lift dolly may be equipped with lights and speakers as a means for providing audio and visual warnings that the hydraulic system is in use. The lights and speakers can be activated with the hydraulic actuators. Additional lights may also be attached to allow users to activate the hydraulic lift dolly more easily in dimly lit or dark situations. These additional lights may be activated with a switch dedicated to these lights.

In yet another embodiment of the present invention, the hydraulic lift dolly may be equipped with internet connectivity and a touchpad display. The internet connectivity will allow users to communicate with other users to coordinate efforts involving large moving projects. The internet connectivity can also be incorporated into the speaker system allowing users to play music, audio books or other files, or to live-stream audio and visual communications. The hydraulic dolly can be used for household and industrial purposes. The materials of the dolly allow light-weight and easy maneuverability of the lift dolly of the present invention. The tray is positioned in front of the frame of the dolly, and the wheels or casters can move freely for easy movement of the dolly.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
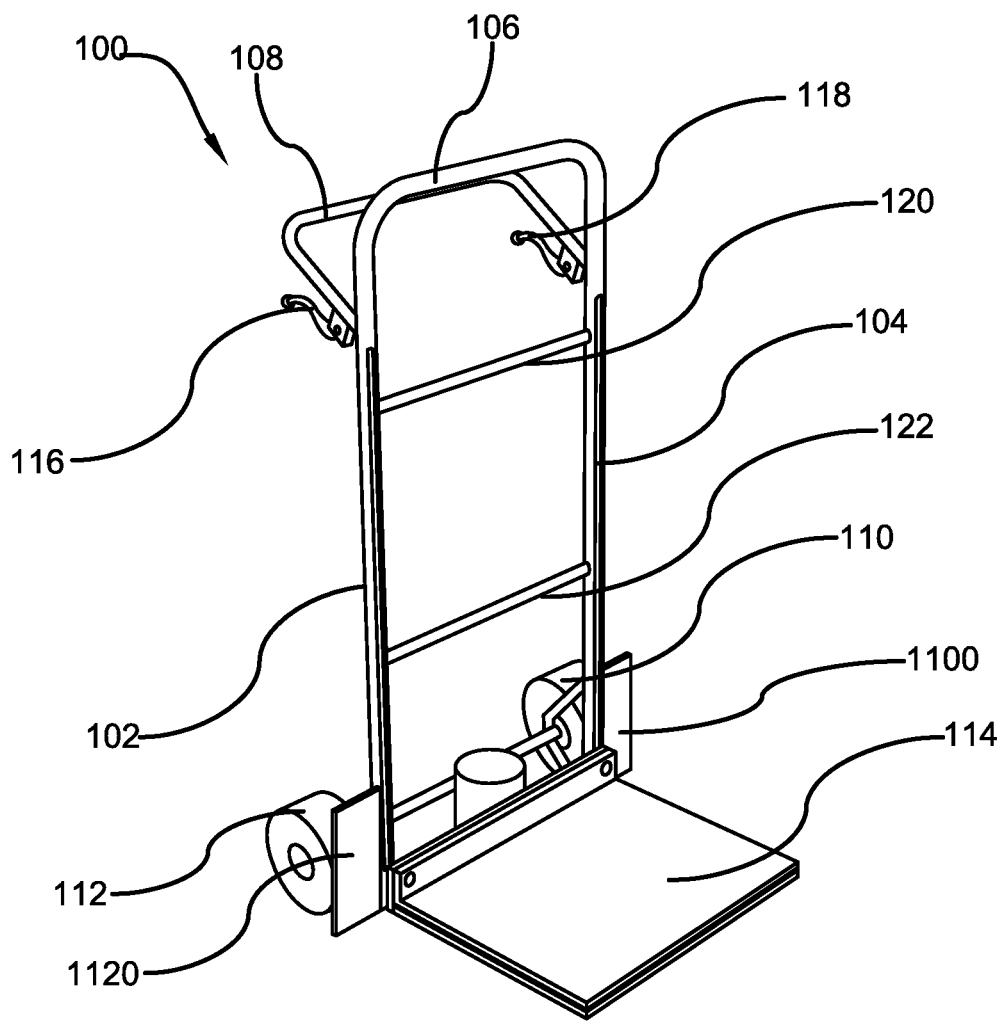
FIG. 1 illustrates a perspective view of one potential embodiment of the hydraulic lift dolly of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a lifting dolly system which assists the users in transporting heavy and bulky items from one place to another. There is also a long-felt need in the art for a lifting dolly system that eliminates the need to manually lift heavy and bulky objects from the base of the conventional lifting dollies. Additionally, there is a long-felt need in the art for a lifting dolly system that does not requires the users to bend over to pick up objects from the base of standard lifting dollies. Moreover, there is a long-felt need in the art for a lifting dolly system that is easy to use by elderly and physically-challenged or disabled persons. Further, there is a long-felt need in the art for an improved lifting dolly system that reduces the risk of bodily injuries or strains. Furthermore, there is a long-felt need in the art for a modified lifting dolly system that is easy to use and makes the transporting process easier for the users. Finally, there is a long-felt need in the art for an improved lifting dolly system that allows the users to frequently transport heavy and bulky items from one place to another without the need to bend over or lift heavy or bulky items.

The present invention, in one exemplary embodiment, is a novel hydraulic vertical lift dolly. The lift dolly is configured and designed to lift or lower a tray using a built-in hydraulic mechanism. The lift dolly further comprises a pair of support arms, a pair of actuation arms, a tray configured to act as a load platform, a pair of wheels or casters and a handle attached to the support arms. The hydraulic mechanism comprises of a pair of hydraulic cylinders, with each hydraulic cylinder present within the hollow support arms and connected to a common hydraulic source, the pair of cylinders lift the tray when the pair of actuation triggers are pushed by an operator, which activates the power of the hydraulic source to provide power to the hydraulic cylinders to lift the connected tray. The actuation triggers are released when the tray reaches a desired height along the support arms. The wheels or casters allow the movement of the dolly on any plane surface, or even on a carpet.

Referring initially to the drawings, FIG. 1 illustrates a perspective view of one potential embodiment of the hydraulic lift dolly 100 of the present invention in accordance with the disclosed architecture. More specifically, the hydraulic lift dolly 100 of the present invention in comprised of two generally parallel and spaced-apart support arms, namely a left arm 102 and a right arm 104. The support arms 102, 104 are connected through a lateral connecting arm 106. Alternatively, the support arms 102, 104 and the lateral connecting arm 106 may be comprised of a single integral unit of hollow metal pipe. The hydraulic dolly 100 further comprises a pair of wheels 110, 112 configured to wheel the dolly 100 across a floor or other surface. The first wheel 110 has a first wheel attachment 1100, and the second wheel 112 has a second wheel attachment 1120 to support the movement of the wheels. The first and second wheel attachments 1100, 1120 also provide adequate support to the wheels 110, 112 while the hydraulic lift dolly 100 is in motion.

The wheels 110, 112 preferably have a relatively large radius (i.e. in excess of 4 inches) and are comprised of a heavy-duty and durable material such as, but not limited to, a rubber, polymer or combination thereof In a preferred embodiment, the wheels 110, 112 also exhibit high impact shock absorption, noise reduction, rollability, high speeds and excellent maneuverability. Furthermore, the wheels 110, 112 should be capable of functioning on many different types of surfaces and terrains, thereby making the hydraulic lift dolly 100 viable for both indoor and outdoor usage.

The support arms 102, 104 are hollow and act as hydraulic cylinders or have hydraulic cylinders within the arms. The hydraulic fluid within the hydraulic cylinders is pumped by a hydraulic source 302 of the hydraulic lift dolly 100 as a means to lift the dolly tray 114. A lateral handle 108 to hold and easily move the dolly 100 is attached to the support arms 102, 104 near the top end of both support arms 102, 104. To trigger the movement of the hydraulic cylinders within the arms 102, the dolly 100 has a pair of actuation triggers 116, 118 connected to the hydraulic system of the dolly 100. The actuation triggers 116, 118 can be easily actuated by a user's hands while holding the lateral handle 108.

The actuation trigger 116 is connected to the hydraulic cylinder present within the support arm 102 and the actuation trigger 118 is connected to the hydraulic cylinder present within the support arm 104. The hydraulic power or source may be present at the rear portion of the dolly 100. The body of the dolly 100 is constructed using a strengthened frame and houses a hydraulic power source, hydraulic cylinders and a plurality of locking pins and corresponding openings spaced apart along the length of each support arm to engage with the dolly tray 114.

The lift dolly 100 of the present invention combines the lifting and transporting process. A user can easily operate the dolly 100 and items can be transported and lifted from the dolly 100, eliminating the need to manually bend and lift items from the dolly. The handle 108 and the actuation triggers 116, 118 are ergonomically designed. The actuation triggers 116, 118 are actuated simultaneously to safely activate the hydraulic system of the dolly 100 for quick and easy raising and lowering of loads placed on the dolly tray 114.

The support arms 102, 104 are connected to each other with a plurality of supporting bars 120, 122 to provide stability to the dolly structure. The supporting bars 120, 122 are welded or removably attached to the support arms 102, 104. In one embodiment, the lift height is 40". Alternatively, the lift height can be 54" or 60". The lift dolly 100 is corrosion free, light-weight and sturdy. In the preferred embodiment, the dolly 100 has a heavy-duty steel construction for maximum durability and resilience. The upright and compact design of the dolly 100 takes up a small amount of floor space for added maneuverability in small and tight areas.

Figure 2:
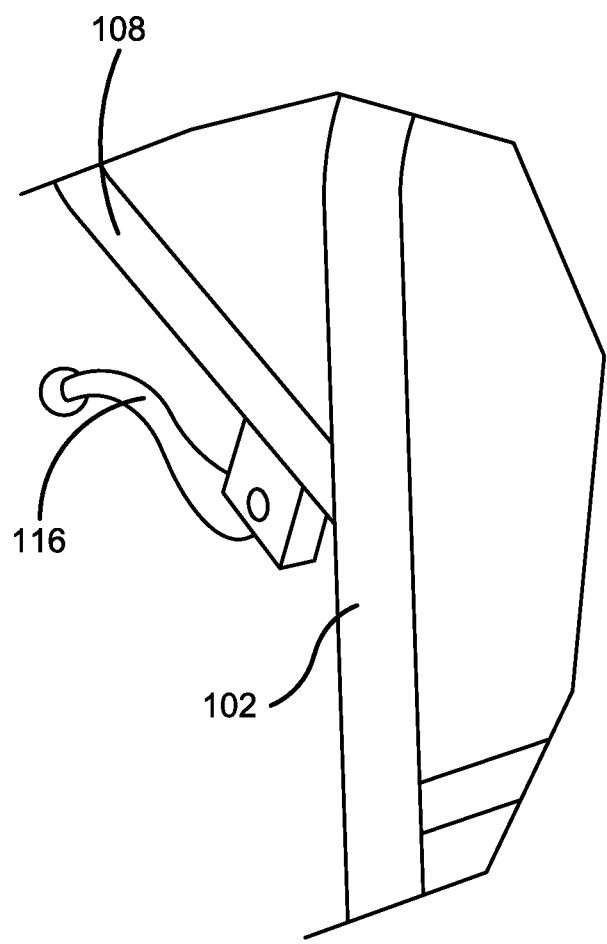
FIG. 2 illustrates a close-up perspective view of one potential embodiment of an actuation trigger of the hydraulic lift dolly of the present invention in accordance with the disclosed architecture, wherein the actuation trigger is used to activate the hydraulic lifting mechanism.

FIG. 2 illustrates a close-up perspective view of one potential embodiment of an actuation trigger 116 of the hydraulic lift dolly 100 of the present invention in accordance with the disclosed architecture, wherein the actuation trigger 116 is used to activate the hydraulic lifting mechanism. More specifically, the actuating trigger 116 is removably attached to the handle 108 and the handle 108 is joined to the supporting arm 102. The actuating trigger 116 is connected to the hydraulic lifting system and on actuating the trigger 116, a hydraulic source 302 lifts the tray of the dolly 100 using the hydraulic cylinders present within the support arms 102, 104.

It should be noted that the hydraulic cylinders present within the support arms 102, 104 extend from the bottom of the dolly 100 to the height of the actuating triggers. It should appreciated that alternative lifting means, such as scissor-type lifts, radial lifts or lift arms may be provided for lifting the dolly tray.

Figure 3:
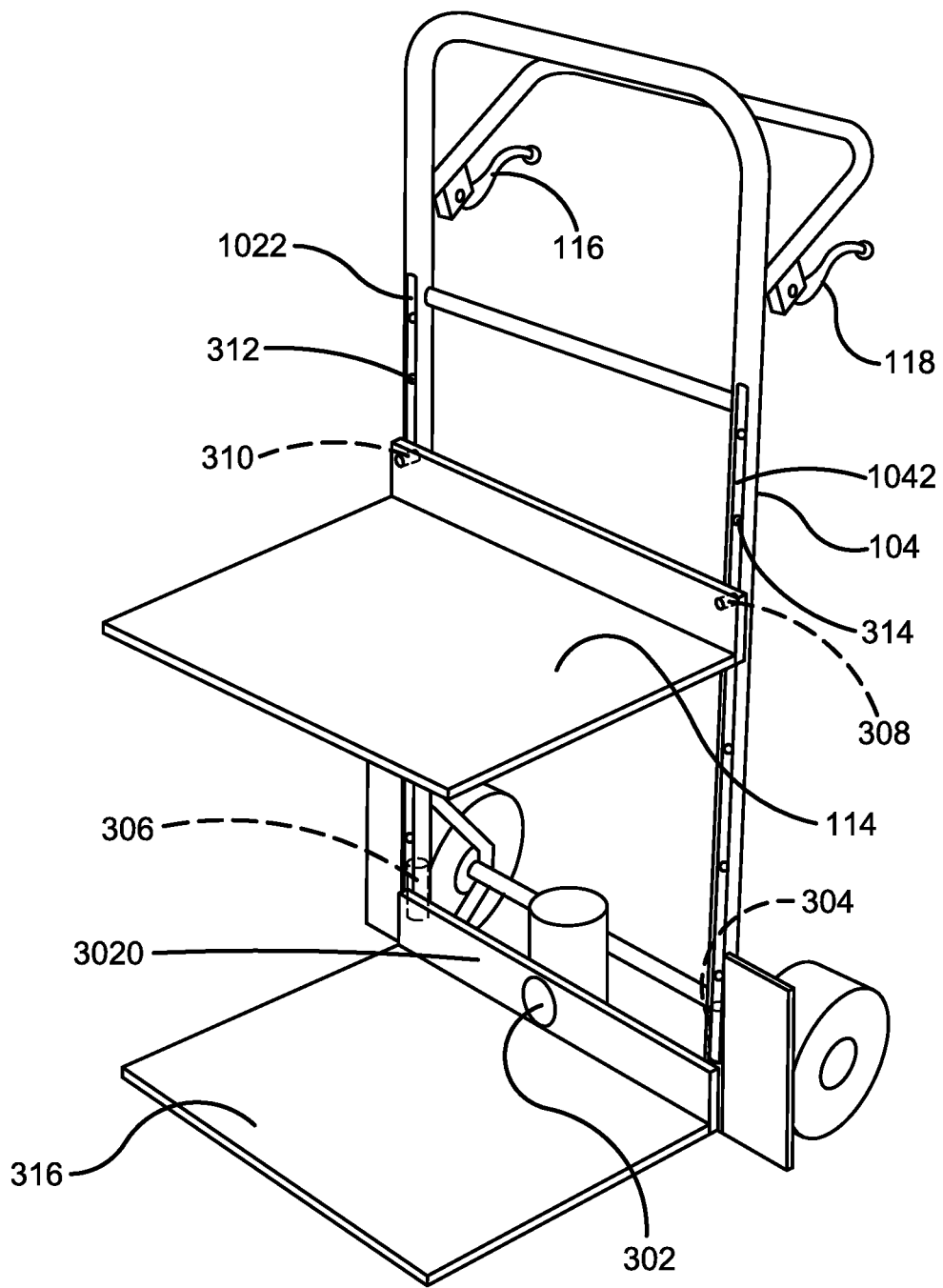
FIG. 3 illustrates a perspective view of one potential embodiment of the hydraulic lift dolly of the present invention in accordance with the disclosed architecture, wherein the hydraulic mechanism is used to raise and lower the tray of the hydraulic lift dolly.

FIG. 3 illustrates a perspective view of one potential embodiment of the hydraulic lift dolly 100 of the present invention in accordance with the disclosed architecture, wherein the hydraulic mechanism is used to raise and lower the tray 114 of the hydraulic lift dolly 100. More specifically, the hydraulic mechanism is comprised of a relatively small hydraulic source 302 positioned at the bottom rear portion 3020 of the dolly 100. The support arms 102, 104 have hollow channels 1022, 1042 respectively for the hydraulic mechanism, thereby allowing the hydraulic cylinders to move upward and downward to reposition the tray 114 upon actuation of the actuation triggers 116, 118. More specifically, the left support arm 102 has the hydraulic cylinder 306 and the right support arm 104 has the hydraulic cylinder 304. The hydraulic cylinders 304, 306 are configured to move the tray 114 upwards from bottom tray 316 and downwards to the bottom tray 316 along the channels 1042 and 1022, and the hydraulic source 302 provides the force to move the hydraulic cylinders 304, 306 upward on actuation.

Each channel 1022, 1042 has a plurality of recesses 312, 314 respectively along the longitudinal length of the support arms 102, 104. The left support arm 102 has a plurality of recesses 312 and the right support arms has a plurality of recesses 314. To secure the tray at a desired height along the support arms 102, 104, on releasing the actuation triggers 116, 118, one of the recesses 314 in each support arm may receive a locking pin 308 connected to the ends of the tray 114. The right locking pin 308 engages with one of the right recesses 314 and the left locking pin 310 engages with one of the left recesses 312 to secure the tray 114 at the desired height. There can be a trigger button to lower the tray along the channels 1022, 1042 using the hydraulic mechanism. Alternatively, the tray can be manually lowered to the bottom of the hydraulic dolly 100. The hydraulic source 302 provides the hydraulic power to the cylinders 304, 306 on actuating the triggers 116, 118.

The lift dolly 100 is hand-operated and is a vertical lift dolly. An item can be placed on the tray 114 and is lifted or lowered using the hydraulic cylinders 304, 306. The tray 114 is locked in place using the locking pins 308, 310 once the tray 114 has been raised to the desired height. The tray remains horizontal and stable throughout the upward and downward movement. The actuating triggers 116, 118 engage the hydraulic source 302 to power lift or lower the dolly tray 114 using the hydraulic cylinders.

The hydraulic mechanism used in the present invention holds a load at a desired height for a considerable length of time once the dolly tray has reached that height. It should be noted that any additional mechanical locking mechanism can be used in addition to the hydraulic mechanism to secure the tray in the lifted position. It should be appreciated that alternative lifting means such as scissor-type lifts, radial lifts or lift arms may also be provided for lifting the dolly trolly.

Figure 4:
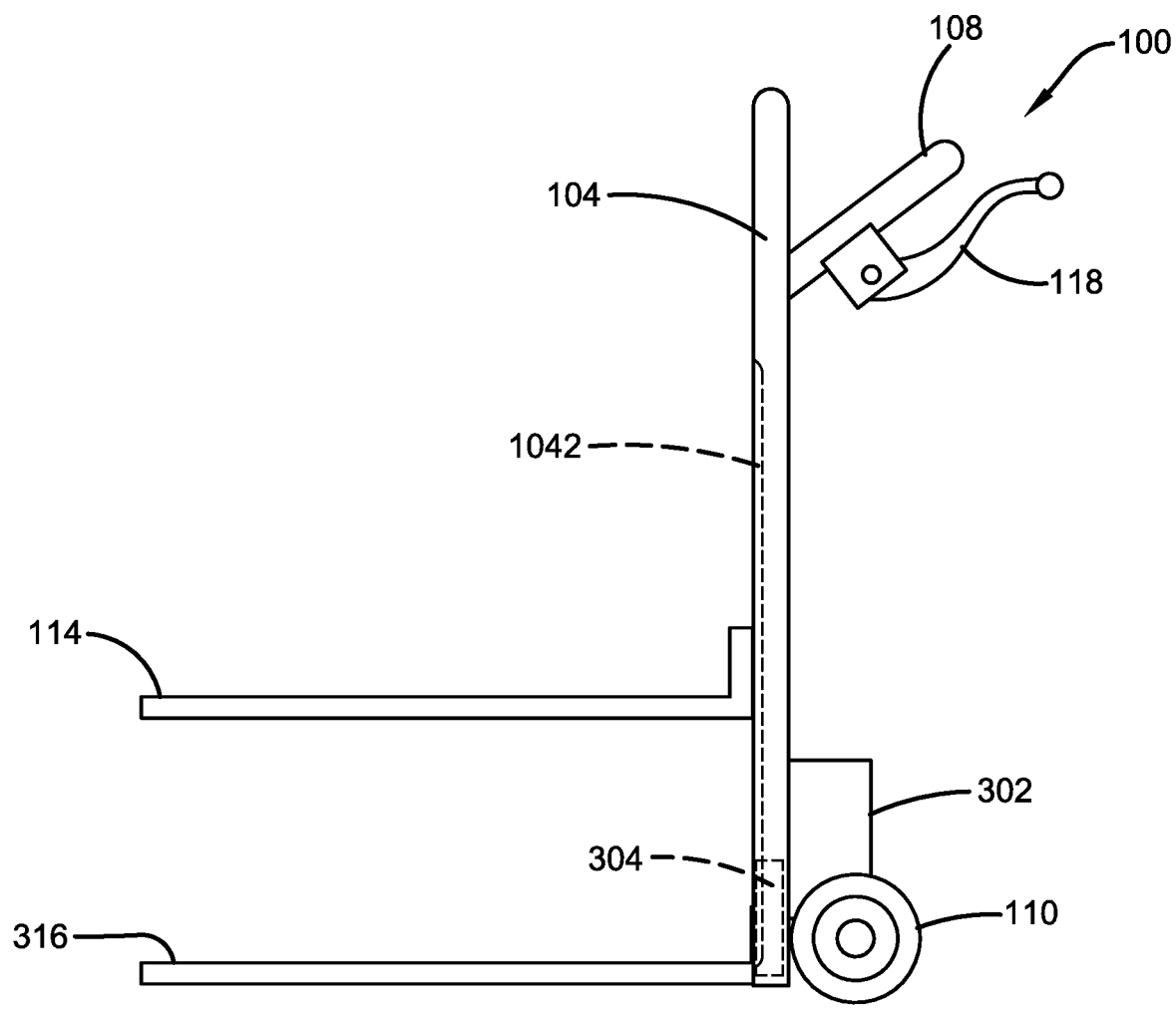
FIG. 4 illustrates a side perspective view of one potential embodiment of the hydraulic lift dolly of the present invention in accordance with the disclosed architecture, wherein the hydraulic mechanism is used to raise and lower the tray of the hydraulic lift dolly.

FIG. 4 illustrates a side perspective view of one potential embodiment of the hydraulic lift dolly 100 of the present invention in accordance with the disclosed architecture, wherein the hydraulic mechanism is used to raise and lower the tray 114 of the hydraulic lift dolly 100 and any object placed thereon. More specifically, the tray 114 is lifted from the bottom plate 316 by the hydraulic mechanism which has a hydraulic source 302. The hydraulic cylinder 304 is connected to the hydraulic source 302 and is provided hydraulic power for lifting the tray 114. The hydraulic cylinder 304 is configured to move along the right channel 1042 present in the support arm 104. The triggering of the actuation arm 118 on the lateral handle 108 triggers the hydraulic source 302. The hydraulic source 302 is present at the rear portion of the dolly 100 and does not impede the movement of the casters 110. The actuation arm 118 is connected to the right channel 1042 and allows the upward movement of the hydraulic cylinder 204, which is connected to the tray 114.

Figure 5:
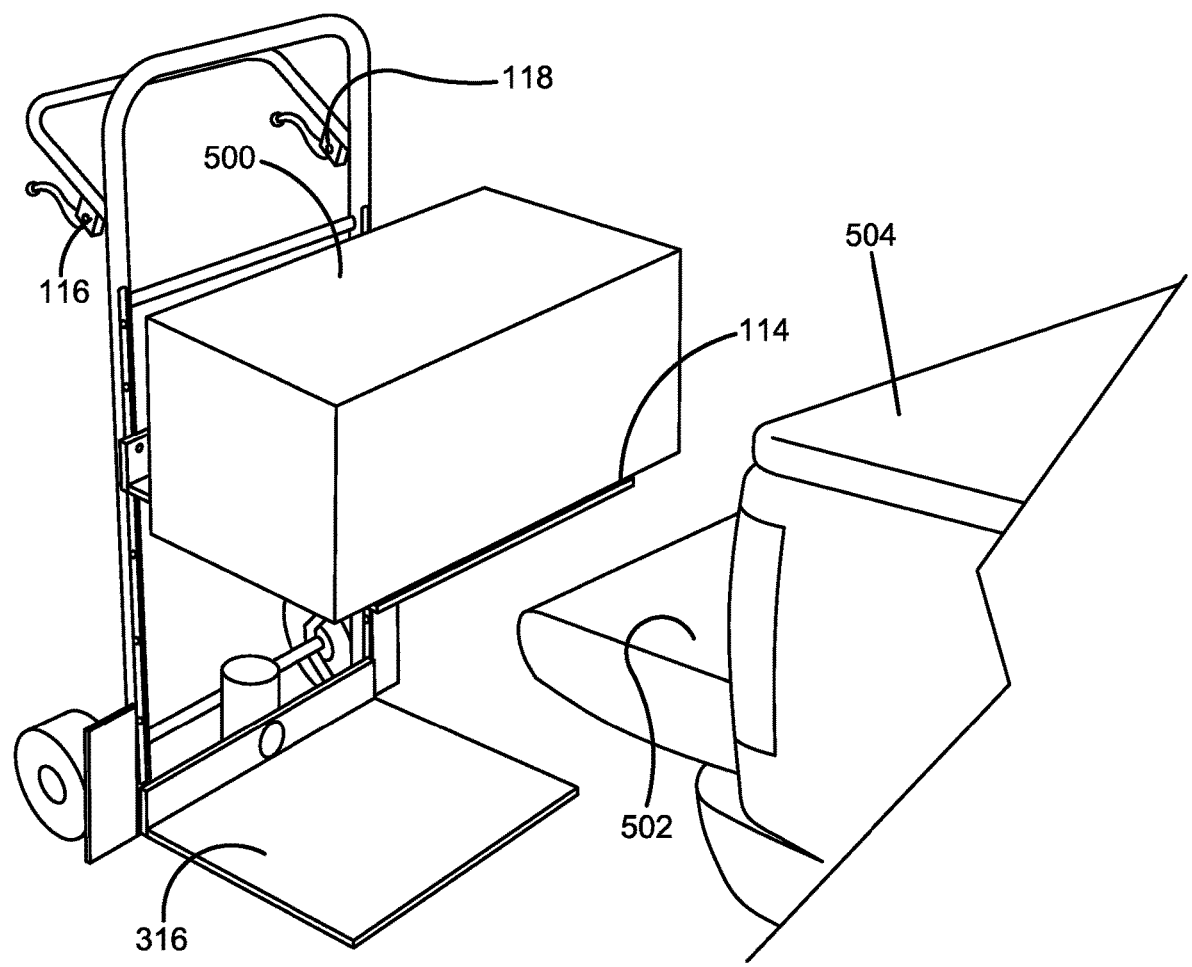
FIG. 5 illustrates a perspective view of one potential embodiment of the hydraulic lift dolly of the present invention being used to load an object into the bed of a pickup truck in accordance with the disclosed architecture.

FIG. 5 illustrates a perspective view of one potential embodiment of the hydraulic lift dolly 100 of the present invention being used to load an object into the bed of a pickup truck in accordance with the disclosed architecture. More specifically, using the hydraulic mechanism of the hydraulic dolly 100, the tray 114 is lifted along the support arms from the bottom tray 316. A heavy object 500 can be easily placed on the tray or load platform 114 to move the object 500 to an elevated place such as the bed 502 of a vehicle 504. Using the powerful hydraulic mechanism of the dolly lift 100, the tray 114 can be lifted with the object 500 placed on it.

To lift the tray 114, the actuating triggers 116, 118 are pressed by an operator to activate the hydraulic mechanism of the dolly 100 which pushes the tray 114 upwards by the power provided by the hydraulic source to the hydraulic cylinders of the support arms. The lift dolly 100 of the present invention provides a new lightweight and portable hydraulic dolly lift, which is susceptible of a low cost of manufacture regarding both materials and labor, and accordingly is then susceptible of low prices of sale to the consuming public, thereby making said hydraulic lifting dolly economically available to the buying public. During the upward and downward movement of the dolly lift tray 114, the support bars, 120, 122 remain stationary and the moveable lift tray is hydraulically-elevated along the spaced-apart support bars.

As stated above and best shown in FIG. 5, the hydraulic lift dolly 100 may further comprise one or more lights 130 and/or speakers/alarms 140 as a means for providing visual and/or audio warnings that the hydraulic lift dolly 100 is in use. The lights 130 and speakers 140 may be activated when the hydraulic actuators 116, 118 are engaged, and may be powered by a battery 145. Additional lights 130 may also be attached to the frame of the dolly 100 to allow users to use the hydraulic lift dolly 100 more easily at night or in dimly lit conditions. The lights 130 may also be manually activated/de-activated with a switch 132, and the battery 145 may be a disposable or rechargeable battery that is in electrical communication with each of the lights 130, light switch 132 and the speakers 140.

In yet another embodiment of the present invention, the hydraulic lift dolly 150 may be equipped with a wireless communication module/touchpad display 150. The wireless communication module/touchpad display 150 will allow an individual to communicate with others to, for example, coordinate efforts involving large moving projects. The wireless communication module 150 can also be powered by the battery 145, and in wireless communication with the speaker system 140, thereby allowing a user to play music, audio books, or other files, or live stream audio and visual communications.

Certain terms are used throughout the description and claims herein to refer to particular features or components. As one skilled in the art will appreciate, different persons may refer to the same feature or component by different names. This document does not intend to distinguish between components or features that differ in name but not structure or function. As used herein "hydraulic lift dolly", "hydraulic lift dolly system", "hydraulic lifting dolly", "hydraulic lifting dolly system", "hydraulic dolly", "dolly lift", and "dolly" are interchangeable and refer to the hydraulic lift dolly 100 of the present invention.

Notwithstanding the forgoing, the hydraulic lift dolly 100 of the present invention can be of any suitable size and configuration as is known in the art without affecting the overall concept of the invention, if it accomplishes the above-stated objectives. One of ordinary skill in the art will appreciate that the size, configuration, and material of the hydraulic lift dolly 100 as shown in the FIGS. are for illustrative purposes only, and that many other sizes and shapes of the hydraulic lift dolly 100 are well within the scope of the present disclosure. Although the dimensions of the hydraulic lift dolly 100 are important design parameters for user convenience, the hydraulic lift dolly 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described herein includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hydraulic lift dolly comprising:
   a pair of support arms;
   at least one supporting member attached to each of the pair of support arms;
   a pair of actuation triggers;
   a pair of hydraulic cylinders;
   a tray that is repositionable;
   a pair of shock absorbing multi-terrain wheels;
   a handle attached to the pair of support arms; and
   a speaker system configured to alert a user that at least one of the pair of actuation triggers has been triggered, and to play music received wirelessly.

2. The hydraulic lift dolly as recited in claim 1 further comprising a left wheel attachment and a right wheel attachment.

3. The hydraulic lift dolly as recited in claim 2, wherein a first one of the pair of hydraulic cylinders in housed within an opening in a first one of the pair of support arms, and further wherein a second one of the pair of hydraulic cylinders in housed within an opening in a second one of the pair of support arms.

4. The hydraulic lift dolly as recited in claim 3, wherein the first one of the pair of support arms is generally parallel to, and spaced apart from, the second one of the pair of support arms.

5. The hydraulic lift dolly as recited in claim 4 further comprising a second tray.

6. The hydraulic lift dolly as recited in claim 5, wherein the second tray is stationary and positioned closer to the pair of wheels than the tray that is repositionable.

7. The hydraulic lift dolly as recited in claim 6 further comprising at least one locking pin for retaining a the tray in a desired position relative to the pair of support arms.

8. The hydraulic lift dolly as recited in claim 7, wherein the pair of support arms comprise a plurality of spaced apart openings along their length for selective receipt of the at least one locking pin.

9. The hydraulic lift dolly of claim 8 further comprising a first light, wherein the first light is activated by at least one of the pair of actuation triggers.

10. The hydraulic lift dolly of claim 9 further comprising a second light, wherein the second light is activated by at least one of the pair of actuation triggers or a light switch.

11. The hydraulic lift dolly of claim 8 further comprising a wireless communication module.

12. The hydraulic lift dolly of claim 11 further comprising a battery.

13. A hydraulic lift dolly system comprising:
    a dolly comprising a pair of shock absorbing multi-terrain wheels, a bottom tray, a repositionable tray, a left support arm and a right support arm, wherein the left support arm and the right support arm are connected to the bottom tray at a normal angle;
    a hydraulic system comprising a hydraulic power source attached to the bottom tray, a left hydraulic cylinder contained within the left support arm, a right hydraulic cylinder contained within the right support arm, and a pair of hydraulic actuators in communication with the hydraulic power source to control the left hydraulic cylinder and the right hydraulic cylinder;
    a speaker system configured to alert a user that at least one of the pair of actuation triggers has been triggered, and to play an audio book received wirelessly;
    a plurality of frame lights attached to the dolly activatable via the pair of hydraulic cylinders or at least one of the pair of actuation triggers, and configured to provide additional illumination; and
    a plurality of indicating lights configured to communicate a visual warning that the hydraulic lift dolly is in use.

14. The hydraulic lift dolly system of claim 13 further comprising a communication system.

15. The hydraulic lift dolly system of claim 14, wherein the communication system is comprised of a wireless communication module and a battery.

16. The hydraulic lift dolly system of claim 14, wherein the repositionable tray is repositionable along said left and right support arms, relative to the bottom tray.

17. A hydraulic lift dolly system comprising:
    a dolly comprising at least one pair of shock absorbing multi-terrain wheels, a bottom tray, a repositionable tray, a locking pin, a left support arm and a right support arm, wherein the left support arm and the right support arm are connected to one another in a spaced apart and parallel fashion by a plurality of connecting members, and further wherein each of the left and right support arms are comprised of a plurality of openings therein for receipt of the locking pin;

a hydraulic system comprising a hydraulic power source attached to the bottom tray, a left hydraulic cylinder contained within the left support arm, a right hydraulic cylinder contained within the right support arm, and a pair of hydraulic actuators in communication with the hydraulic power source to control the left hydraulic cylinder and the right hydraulic cylinder;

a speaker system configured to alert a user that at least one of the pair of actuation triggers has been triggered;

a plurality of frame lights attached to the dolly activatable via the pair of hydraulic cylinders or at least one of the pair of actuation triggers, and configured to provide additional illumination;

a plurality of indicating lights configured to communicate a visual warning that the hydraulic lift dolly is in use; and a wireless communication system comprising a display and configured to allow a user to coordinate a moving project and to live stream music, an audio book, or a video to the display and the speaker system.

* * * * *